United States Patent
Reider et al.

(10) Patent No.: US 10,627,129 B2
(45) Date of Patent: Apr. 21, 2020

(54) METHOD AND SYSTEM FOR OPERATING A THERMAL ENERGY EXCHANGER

(71) Applicant: BELIMO HOLDING AG, Hinwil (CH)

(72) Inventors: Forest Reider, Wetzikon ZH (CH); Marc Thuillard, Uetikon am See (CH); Stefan Mischler, Wald (CH); Ronald Aeberhard, Grüt (CH)

(73) Assignee: BELIMO HOLDING AG, Hinwil (CH)

( * ) Notice: Subject to any disclaimer, the term of this patent is extended or adjusted under 35 U.S.C. 154(b) by 51 days.

(21) Appl. No.: 15/744,178

(22) PCT Filed: Jul. 25, 2016

(86) PCT No.: PCT/EP2016/067657
§ 371 (c)(1),
(2) Date: Jan. 12, 2018

(87) PCT Pub. No.: WO2017/036674
PCT Pub. Date: Mar. 9, 2017

(65) Prior Publication Data
US 2018/0195753 A1 Jul. 12, 2018

(30) Foreign Application Priority Data
Sep. 1, 2015 (CH) .................................. 1255/15

(51) Int. Cl.
*F24F 11/30* (2018.01)
*F24F 11/64* (2018.01)
(Continued)

(52) U.S. Cl.
CPC .............. *F24F 11/65* (2018.01); *F24F 11/30* (2018.01); *F24F 11/62* (2018.01); *F24F 11/64* (2018.01);
(Continued)

(58) Field of Classification Search
CPC .. F24F 11/30; F24F 11/62; F24F 11/63; F24F 11/64; F24F 11/65; F24F 11/74;
(Continued)

(56) References Cited

U.S. PATENT DOCUMENTS

| 9,874,880 B2 * | 1/2018 | Thuillard | ............. G05D 7/0635 |
| 2014/0083673 A1 * | 3/2014 | Thuillard | ............ F24D 19/1015 165/299 |

(Continued)

FOREIGN PATENT DOCUMENTS

WO 2014/183868 A2 11/2014

OTHER PUBLICATIONS

Gregor P. Henze et al. "Improving campus chilled water systems with intelligent control valves: A field study", AEI 2013, Apr. 5, 2013 (pp. 102-111).

(Continued)

*Primary Examiner* — Abdelmoniem I Elamin
(74) *Attorney, Agent, or Firm* — Sughrue Mion, PLLC

(57) ABSTRACT

For operating a thermal energy exchanger (1) for exchanging thermal energy between a thermal transfer fluid and air, a plurality of measurement data sets are recorded in a control system (40). The measurement data sets include for a different point in time data values which define a normalized energy transfer that represents the thermal energy transferred in the thermal energy exchanger (1) normalized by one or more normalization variables. The control system (40) calculates for each of the measurement data sets a normalized data point defined by the normalized energy transfer. The control system (40) further determines for the thermal energy exchanger (1) a characteristic energy transfer curve which fits the normalized data points. Normalizing the energy transfer makes it possible to operate the thermal energy exchanger (1) more efficiently over a wider range of (Continued)

changing conditions, as saturation can be prevented using more appropriate fixed or variable thresholds.

25 Claims, 8 Drawing Sheets

(51) Int. Cl.
  F24F 11/65    (2018.01)
  F24F 11/74    (2018.01)
  G05B 17/02    (2006.01)
  F24F 11/62    (2018.01)
  F24F 11/63    (2018.01)
  F24F 110/30   (2018.01)
  F24F 140/20   (2018.01)
  F24F 110/10   (2018.01)

(52) U.S. Cl.
  CPC .............. F24F 11/74 (2018.01); G05B 17/02 (2013.01); F24F 11/63 (2018.01); F24F 2110/10 (2018.01); F24F 2110/30 (2018.01); F24F 2140/20 (2018.01)

(58) Field of Classification Search
  CPC ............... F24F 2110/10; F24F 2110/30; F24F 2140/20; G05B 17/02
  See application file for complete search history.

(56) References Cited

U.S. PATENT DOCUMENTS

| | | | |
|---|---|---|---|
| 2015/0060557 A1* | 3/2015 | Lau | F24F 11/0008 236/44 C |
| 2015/0176931 A1* | 6/2015 | Aeberhard | F28F 27/00 165/200 |
| 2016/0054741 A1* | 2/2016 | Thuillard | G05D 7/0635 |
| 2016/0252262 A1* | 9/2016 | Mariotto | F24F 13/22 62/90 |

OTHER PUBLICATIONS

Peter Cooper et al: "Delta T Mitigation Strategies Tested on MIT Hayden AHU's Outline @BULLET Chilled Water DT Study @BULLET AHU Coil Overview @BULLET Cooling Overview @BULLET Test Setup @BULLET Data Analysis @BULLET Findings @BULLET Summary", Feb. 8, 2012, Retrieved from the Internet: Retrieved from the Internet: URL:http://www.districtenergy.org/assets/pdfs/2012-Campus-Arlington/Presentations/Wednesday-B/7B1COOPERHUBBELLRYBKAIDEA-20127B-Delta-TMIT-CooperBelimo-Hubbel1.pdf [retrieved on Dec. 9, 2015] 34 pages.
"Knowledge is Power Belimo Energy Valve(TM)", Nov. 20, 2012, Retrieved from the Internet: URL:http://www.belimo.us/belimo/media/Energy_Valve/Energy_Valve_0verview.pdf [retrieved on Dec. 9, 2015] (44 pages).

* cited by examiner

METHOD AND SYSTEM FOR OPERATING A THERMAL ENERGY EXCHANGER

CROSS REFERENCE TO RELATED APPLICATIONS

This application is a National Stage of International Application No. PCT/EP2016/067657 filed Jul. 25, 2016, claiming priority based on Switzerland Patent Application No. 01255/15 filed Sep. 1, 2015, the contents of all of which are incorporated herein by reference in their entirety.

FIELD OF THE INVENTION

The present invention relates to a method and a control system for operating a thermal energy exchanger. Specifically, the present invention relates to a method and a control system for operating a thermal energy exchanger of an HVAC (Heating, Ventilating, and Air Conditioning) system for exchanging thermal energy between a thermal transfer fluid, flowing through the thermal energy exchanger in a fluid conduit, and air, being conducted through the thermal energy exchanger in an air duct.

BACKGROUND OF THE INVENTION

By regulating the flow of fluid through thermal energy exchangers of an HVAC system, it is possible to adjust the amount of energy exchanged by the thermal energy exchangers, e.g. to adjust the amount of energy delivered by a heat exchanger to heat or cool a room in a building or the amount of energy drawn by a chiller for cooling purposes. While the fluid transport through the fluid circuit of the HVAC system is driven by one or more pumps, the flow is typically regulated by varying the opening or position of valves, e.g. manually or by way of actuators. It is known that the efficiency of thermal energy exchangers is reduced at high flow rates where the fluid rushes at an increased rate through the thermal energy exchangers, without resulting in a significant increase in energy exchange.

U.S. Pat. No. 6,352,106 describes a self-balancing valve having a temperature sensor for measuring the temperature of a fluid passing through the valve. According to U.S. Pat. No. 6,352,106, the range and thus the maximum opening of the valve are adjusted dynamically, depending on the measured temperature. The opening of the valve is modulated based on a stored temperature threshold value, the current fluid temperature, and a position command signal from a load controller. Specifically, the opening range of the valve is set periodically by a position controller, based on a temperature threshold value stored at the position controller, the current fluid temperature, and the difference between the previously measured fluid temperature and the current fluid temperature. U.S. Pat. No. 6,352,106 further describes an alternative embodiment with two temperature sensors, one placed on the supply line and the other one placed on the return line, for measuring the actual differential temperature over the load, i.e. the thermal energy exchanger. According to U.S. Pat. No. 6,352,106, in this alternative embodiment, the threshold temperature is a threshold differential temperature across the load determined by system requirements of the load. Thus, U.S. Pat. No. 6,352,106 describes controlling the flow based on a change in fluid temperature or a change in a differential temperature over the load. Accordingly, the flow is controlled based on a comparison of determined temperature changes to fixed threshold temperatures or threshold differential temperatures, respectively, which must be predefined and stored at the valve's position controller. Consequently, to avoid incorrect and inefficient settings of the valve, it must be ensured, at initial installation time of the system and whenever thermal energy exchangers are replaced with new models, that the stored threshold temperatures or threshold differential temperatures, respectively, match the type and design parameters of thermal energy exchangers used in the HVAC system.

In "Improving Campus Chilled Water Systems with Intelligent Control Valves: A Field Study," AEI 2013, ASCE 2013, Gregor P. Henze, Walter Henry, and Marc Thuillard define the normalized total (sensible and latent) load $$Q_{norm} = \frac{Q_{curr}}{Q_{max}}$$

of a cooling coil as the current load $Q_{curr}$ met at a particular chilled water flow $\Phi_{curr}$ to the total load $Q_{max}$ achieved at maximum flow $\Phi_{max}$, and further define the normalized flow $$\Phi_{norm} = \frac{\Phi_{curr}}{\Phi_{max}}$$

as the current flow $\Phi_{curr}$ to the maximum flow $\Phi_{max}$. Thus, the current load $Q_{curr}$ is scaled by the maximum load $Q_{max}$ and the current flow $\Phi_{curr}$ is scaled by the maximum flow $\Phi_{max}$.

SUMMARY OF THE INVENTION

It is an object of this invention to provide a method and a control system for operating a thermal energy exchanger, which method and control system do not have at least some of the disadvantages of the prior art. In particular, it is an object of the present invention to provide a method and a control system for operating a thermal energy exchanger efficiently under changing conditions, e.g. changing environment and/or operating conditions.

According to the present invention, these objects are achieved through the features of the independent claims. In addition, further advantageous embodiments follow from the dependent claims and the description.

According to the present invention, the above-mentioned objects are particularly achieved in that, to operate a thermal energy exchanger for exchanging thermal energy between a thermal transfer fluid, flowing through the thermal energy exchanger in a fluid conduit, and air, being conducted through the thermal energy exchanger in an air duct, a plurality of measurement data sets are recorded in a control system, particularly in an HVAC control system. Each of the measurement data sets includes, for a different point in time, data values defining a normalized energy transfer which represents the thermal energy transferred in the thermal energy exchanger, from the thermal transfer fluid to the air, normalized by one or more normalization variables including at least one air side variable. The control system calculates for each of the measurement data sets a normalized data point defined by the normalized energy transfer. The control system determines for the thermal energy exchanger a characteristic energy transfer curve which fits the normalized data points.

Normalizing the energy transfer that is based on "raw" measurement data makes it possible to operate the thermal energy exchanger more efficiently over a wider range of changing operating and environment conditions, because the normalized data makes it possible to determine better efficiency thresholds that are more suitable and applicable to variable operating and environment conditions. Consequently, it is possible to prevent the thermal energy exchanger or its coil(s) from reaching saturation by limiting or setting the flow rate of the thermal transfer fluid, the flow of air, and/or the temperature of the thermal transfer fluid with more appropriate fixed or variable thresholds.

In an embodiment, the control system determines a boundary for efficient thermal energy transfer in the thermal energy exchanger between the thermal transfer fluid and the air. The boundary defines an efficient area, where on the characteristic energy transfer curve the thermal energy transfer is more energy efficient than on the characteristic energy transfer curve outside the efficient area. The control system keeps the thermal energy exchanger operating within said efficient area. For example, the boundary defines the efficient area such that on the characteristic energy transfer curve the thermal energy transfer increases comparably more with an increasing flow of thermal transfer fluid, than with an increasing flow of thermal transfer on the characteristic energy transfer curve outside the efficient area. For example, the control system controls operating parameters to maintain operation of the thermal energy exchanger within said efficient area, the operating parameters including the flow of thermal transfer fluid through the thermal energy exchanger, the flow of air through the thermal energy exchanger, and/or the temperature of the thermal transfer fluid entering the thermal energy exchanger.

In an embodiment, the control system controls operating parameters to maintain operation of the thermal energy exchanger on the characteristic energy transfer curve. The operating parameters comprise: the flow of thermal transfer fluid through the thermal energy exchanger, the flow of air through the thermal energy exchanger, and/or the temperature of the thermal transfer fluid entering the thermal energy exchanger.

In a further embodiment, each of the measurement data sets includes an air inlet enthalpy value, an air outlet enthalpy value, a thermal transfer fluid inlet enthalpy value, and a thermal transfer fluid outlet enthalpy value. The control system calculates the normalized energy transfer for each of the normalized data points, using the air inlet enthalpy value, the air outlet enthalpy value, the thermal transfer fluid inlet enthalpy value, and the thermal transfer fluid outlet enthalpy value.

In an embodiment, each of the measurement data sets includes a temperature value of the air entering the thermal energy exchanger, a temperature value of the air exiting the thermal energy exchanger, a humidity value of the air entering the thermal energy exchanger, a humidity value of the air exiting the thermal energy exchanger, a temperature value of the thermal transfer fluid entering the thermal energy exchanger, and a temperature value of the thermal transfer fluid exiting the thermal energy exchanger. The control system calculates the normalized energy transfer for each of the normalized data points, using the temperature value of the air entering the thermal energy exchanger, the temperature value of the air exiting the thermal energy exchanger, the humidity value of the air entering the thermal energy exchanger, the humidity value of the air exiting the thermal energy exchanger, the temperature value of the thermal transfer fluid entering the thermal energy exchanger, and the temperature value of the thermal transfer fluid exiting the thermal energy exchanger.

In a further embodiment, each of the measurement data sets includes for the different points in time the flow of thermal transfer fluid through the thermal energy exchanger and the flow of air through the thermal energy exchanger. The control system calculates for each of the normalized data points a normalized flow of thermal transfer fluid through the fluid conduit normalized by the flow of air.

In an embodiment, each of the measurement data sets includes data values defining a log mean enthalpy difference from an inlet enthalpy difference, of the air entering the thermal energy exchanger and the thermal transfer fluid entering the thermal energy exchanger, and an outlet enthalpy difference, of the air exiting the thermal energy exchanger and the thermal transfer fluid exiting the thermal energy exchanger. The control system calculates the normalized energy transfer for each of the normalized data points using the log mean enthalpy difference.

In a further embodiment, each of the measurement data sets includes the flow of air through the thermal energy exchanger. The control system calculates the normalized energy transfer for each of the normalized data points using the flow of air through the thermal energy exchanger.

In an embodiment, each of the measurement data sets includes the flow of thermal transfer fluid through the thermal energy exchanger. The control system calculates the normalized energy transfer for each of the normalized data points using the flow of thermal transfer fluid through the thermal energy exchanger.

In a further embodiment, each of the measurement data sets includes for the different points in time data values defining an air side enthalpy difference of the air entering the thermal energy exchanger and the air exiting the thermal energy exchanger, and data values defining an enthalpy difference on the thermal transfer fluid side of the thermal transfer fluid entering the thermal energy exchanger and the thermal transfer fluid exiting the thermal energy exchanger. The control system calculates for each of the normalized data points a value representative of the normalized flow, from the air side enthalpy difference and the enthalpy difference on the thermal transfer fluid side.

In an embodiment, each of the measurement data sets includes data values defining a log mean enthalpy difference from an inlet enthalpy difference, of the air entering the thermal energy exchanger and the thermal transfer fluid entering the thermal energy exchanger, and an outlet enthalpy difference, of the air exiting the thermal energy exchanger and the thermal transfer fluid exiting the thermal energy exchanger. The control system calculates the normalized energy transfer for each of the normalized data points using the air side enthalpy difference and the log mean enthalpy difference.

In a further embodiment, each of the measurement data sets includes data values defining a log mean enthalpy difference from an inlet enthalpy difference, of the air entering the thermal energy exchanger and the thermal transfer fluid entering the thermal energy exchanger, and an outlet enthalpy difference, of the air exiting the thermal energy exchanger and the thermal transfer fluid exiting the thermal energy exchanger. The control system calculates the normalized energy transfer for each of the normalized data points using the enthalpy difference on the thermal transfer fluid side and the log mean enthalpy difference.

In an embodiment, each of the measurement data sets includes data values for determining a sensible part and a latent part of the thermal energy transferred in the thermal energy exchanger, from the thermal transfer fluid to the air. The control system calculates a normalized sensible part and a normalized latent part, using one or more normalization variables. The control system further determines boundaries for efficient thermal energy transfer in the thermal energy exchanger between the thermal transfer fluid and the air separately for the normalized sensible part and the normalized latent part. The control system keeps the thermal energy exchanger operating within efficient areas defined by said boundaries.

Splitting the total energy or power transfer into a latent and a sensible portion and normalizing each of the two portions individually, makes it possible to further detect saturation with respect the latent and sensible portion of the energy transfer. For example, when the thermal energy exchanger is used with a chilled water coil, the intention is usually not only to cool, but also to dehumidify the air. The cooling (sensible) and dehumidifying (latent) part have different saturation curves. Thus, it is possible that the latent part already saturates while the total power (and so the sensible part) does not saturate yet. By determining the latent part separately (normalized or non-normalized), it is possible to detect individually saturation of the latent part and, therefore, prevent inefficient operation of the thermal energy exchanger that would otherwise occur, if threshold values were only considered with regards to the total energy transfer.

In a further embodiment, each of the measurement data sets includes a temperature value of the thermal transfer fluid entering the thermal energy exchanger, and a temperature value of the air entering the thermal energy exchanger. The control system calculates the normalized sensible part of the thermal energy transferred in the thermal energy exchanger using the difference of the temperature value of the thermal transfer fluid entering the thermal energy exchanger and the temperature value of the air entering the thermal energy exchanger.

In an embodiment, each of the measurement data sets includes a temperature value of the thermal transfer fluid entering the thermal energy exchanger. The control system calculates the normalized latent part of the thermal energy transferred in the thermal energy exchanger using the difference of the temperature value of a dew point temperature of the air and temperature the thermal transfer fluid entering the thermal energy exchanger.

In a further embodiment, each of the measurement data sets includes a temperature value of the thermal transfer fluid entering the thermal energy exchanger, an absolute humidity value of the air entering the thermal energy exchanger, and a temperature value of the thermal transfer fluid entering the thermal energy exchanger. The control system calculates the normalized latent part of the thermal energy transferred in the thermal energy exchanger using the difference of the absolute humidity value of the of the air entering the thermal energy exchanger and an absolute humidity value at saturation at the temperature value of the thermal transfer fluid entering the thermal energy exchanger.

In an embodiment, the control system determining a characteristic energy transfer curve, which indicates an expected energy transfer in the thermal energy exchanger from the thermal transfer fluid to the air. The control system further detects a deviation of the normalized energy transfer from the expected energy transfer. Upon detection of a deviation, the control system initiates exception processing.

In a further embodiment, the control system selects a characteristic energy transfer curve from a set of different characteristic energy transfer curves, which indicate for different air side parameters an expected energy transfer in the thermal energy exchanger from the thermal transfer fluid to the air, using airside parameters included in the measurement data sets.

In an embodiment, the control system includes in the exception processing at least one of the following steps: generating an alarm signal, selecting an alternative characteristic energy transfer curve from a set of different characteristic energy transfer curves, and determining an alternative characteristic energy transfer curve using the plurality of measurement data sets.

In addition to the method of operating a thermal energy exchanger, the present invention also relates to a control system for operating a thermal energy exchanger for exchanging thermal energy between a thermal transfer fluid, flowing through the thermal energy exchanger in a fluid conduit, and air, being conducted through the thermal energy exchanger in an air duct. The control system comprises at least one processor configured to record in the control system a plurality of measurement data sets. Each of the measurement data sets includes for a different point in time data values defining a normalized energy transfer which represents the thermal energy transferred in the thermal energy exchanger, from the thermal transfer fluid to the air, normalized by one or more normalization variables including at least one air side variable. The processor is further configured to calculate for each of the measurement data sets a normalized data point defined by the normalized energy transfer. The processor is further configured to determine for the thermal energy exchanger a characteristic energy transfer curve which fits the normalized data points.

In an embodiment, the processor is further configured to determine a boundary for efficient thermal energy transfer in the thermal energy exchanger between the thermal transfer fluid and the air. The boundary defines an efficient area, where on the characteristic energy transfer curve the thermal energy transfer is more energy efficient than on the characteristic energy transfer curve outside the efficient area. The processor is further configured to keep the thermal energy exchanger operating within said efficient area.

In a further embodiment, the processor is further configured to control operating parameters to maintain operation of the thermal energy exchanger on the characteristic energy transfer curve, the operating parameters comprising: the flow of thermal transfer fluid through the thermal energy exchanger, the flow of air through the thermal energy exchanger, and/or the temperature of the thermal transfer fluid entering the thermal energy exchanger.

The processor is further configured to perform the steps of the method of operating a thermal energy exchanger.

In addition to the method of operating a thermal energy exchanger and the control system for operating a thermal energy exchanger, the present invention also relates to a computer program product comprising a non-transient computer-readable medium having stored thereon computer program code configured to control a processor of a control system for operating a thermal energy exchanger for exchanging thermal energy between a thermal transfer fluid, flowing through the thermal energy exchanger in a fluid conduit, and air, being conducted through the thermal energy exchanger in an air duct. The computer program code is configured to control the processor such that the processor records in the control system a plurality of measurement data sets. Each of the measurement data sets includes for a different point in time data values that define a normalized energy transfer. The normalized energy transfer represents the thermal energy transferred in the thermal energy exchanger, from the thermal transfer fluid to the air, normalized by one or more normalization variables including at least one air side variable. The computer program code is further configured to control the processor such that the processor calculates for each of the measurement data sets a normalized data point defined by the normalized energy transfer, and that the processor determines for the thermal energy exchanger a characteristic energy transfer curve which fits the normalized data points.

In an embodiment, the computer program code is further configured to control the processor such that the processor determines a boundary for efficient thermal energy transfer in the thermal energy exchanger between the thermal transfer fluid and the air. The boundary defines an efficient area, where on the characteristic energy transfer curve the thermal energy transfer is more energy efficient than on the characteristic energy transfer curve outside the efficient area. The computer program code is further configured to control the processor such that processor keeps the thermal energy exchanger operating within said efficient area.

In a further embodiment, the computer program code is further configured to control the processor such that the processor controls operating parameters to maintain operation of the thermal energy exchanger on the characteristic energy transfer curve, the operating parameters comprising: the flow of thermal transfer fluid through the thermal energy exchanger, the flow of air through the thermal energy exchanger, and/or the temperature of the thermal transfer fluid entering the thermal energy exchanger.

The computer program code is further configured to control the processor such that the processor performs the steps of the method of operating a thermal energy exchanger.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
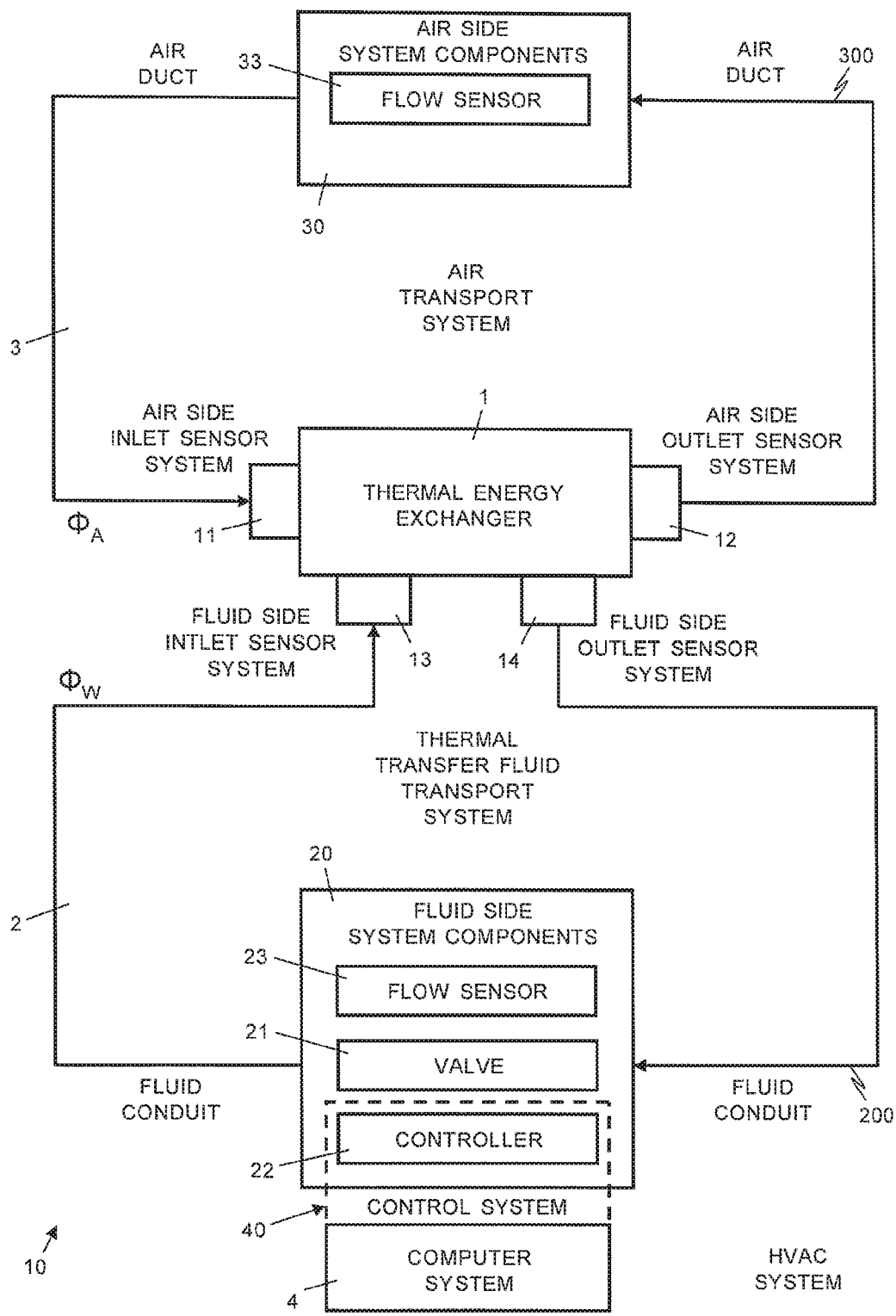
FIG. 1: shows a block diagram illustrating schematically an HVAC system, comprising an air transport system, a thermal transfer fluid transport system, and a thermal energy exchanger.

In FIGS. 1-4, reference numeral 10 refers to an HVAC system (Heating, Ventilation, Air Conditioning, and Cooling). As illustrated in FIG. 1, the HVAC system 10 comprises a thermal energy exchanger 1, e.g. a heat exchanger for heating or a cooling device for cooling. As further illustrated in FIG. 1, the HVAC system 10 comprises an air transport system 3 for moving air through the thermal energy exchanger 1 and a thermal transfer fluid transport system 2 for moving thermal transfer fluid, e.g. water or a refrigerant, through the thermal energy exchanger 1. As indicated schematically in FIG. 1, the air transport system 3 comprises various air side system components 30 and air ducts 300 for conducting an air flow through the thermal energy exchanger 1. The air side system components 30 comprise a ventilator, a controller, and an optional air flow sensor 33 for conducting and controlling the flow of air through the thermal energy exchanger 1 and ultimately through or into a room or building. As further indicated schematically in FIG. 1, the thermal transfer fluid transport system 2 comprises various fluid side system components 20 and fluid conduits 200 for conducting a flow of thermal transfer fluid through the thermal energy exchanger 1. The fluid side system components 20 comprise a motorized valve 21, a controller 22, an optional flow sensor 23, and further components, such as a pump, for conducting and controlling the flow of thermal transfer fluid through the thermal energy exchanger 1.

As illustrated schematically in FIG. 1, the HVAC system 10 further comprises an air side inlet sensor system 11, an air side outlet sensor system 12, a fluid side inlet sensor system 13, and a fluid side outlet sensor system 14. The air side inlet sensor system 11 comprises an enthalpy sensor or a combination of temperature and humidity sensors configured to measure the enthalpy of the air entering the thermal energy exchanger 1. The air side outlet sensor system 12 comprises an enthalpy sensor or a combination of temperature and humidity sensors configured to measure or determine the enthalpy of the air exiting the thermal energy exchanger 1, respectively. The fluid side inlet sensor system 13 comprises a temperature sensor to determine the temperature or enthalpy of the thermal transfer fluid entering the thermal energy exchanger 1. The fluid side outlet sensor system 14 comprises a temperature sensor to determine the temperature or enthalpy of the thermal transfer fluid exiting the thermal energy exchanger 1. The sensor systems 11, 12, 13, 14 further comprise a communication module configured for wireless and/or wired data communication with the computer system 4 and/or the controller(s) 22.

Figure 2:
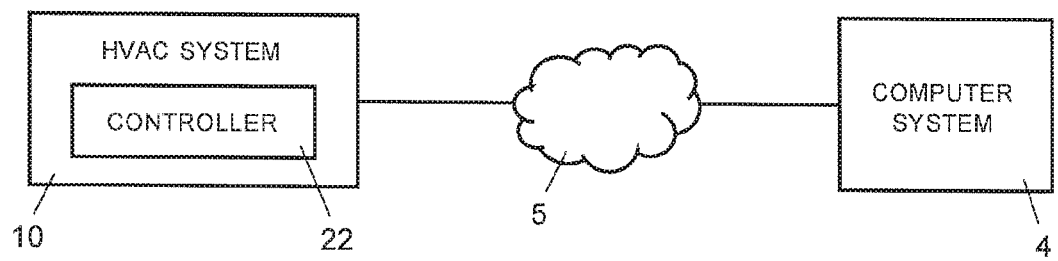
FIG. 2: shows a block diagram illustrating schematically an HVAC system connected via a communication network to a remote computer system.
Figure 3:
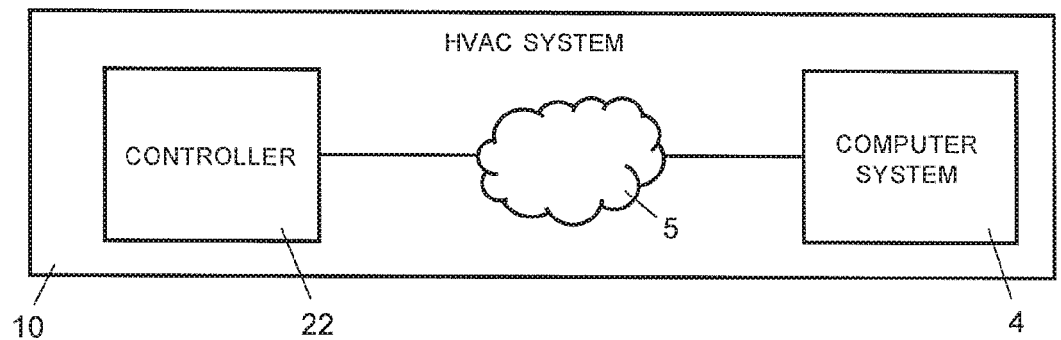
FIG. 3: shows a block diagram illustrating schematically an HVAC system comprising a controller that is connected via a communication network to a local computer system.
Figure 4:
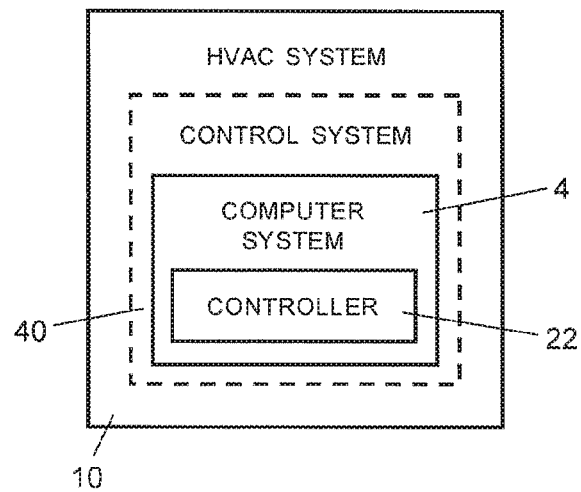
FIG. 4: shows a block diagram illustrating schematically an HVAC system comprising a computer system with a controller.

As illustrated in FIGS. 1-4, the HVAC system 10 comprises or is at least connected via a communication network 5 to a computer system 4. Depending on the embodiment, the computer system 4 comprises one or more operational computers with one or more programmable processors and a data storage system connected to the processor(s). As indicated schematically in FIGS. 1 and 4 by reference numeral 40, the computer system 4 and the controller 22 constitute a control system, particularly a computerized HVAC control system. In the embodiment of FIG. 2, the HVAC system 10 and one or more of its controllers 22 are connected via communication network 5 to a remote computer system 4, e.g. a cloud-based computer system connected to the HVAC system 10 vie the Internet. In the embodiment of FIG. 3, the computer system 4 is a part of the HVAC system 10 and is connected via a communication network 5, such as a LAN (Local Area Network) or WLAN (Wireless Local Area Network), to one or more controllers 22 of the HVAC system 10. In the embodiment of FIG. 4, the computer system 4 is a part of the HVAC system 10 and the controller 22 is part of the computer system 4 or the controller 22 constitutes the computer system 4, respectively. The controller 22 includes an electronic circuit, e.g. a programmable processor, an application specific integrated circuit (ASIC), or another logic unit. The controller 22 further comprise a communication module configured for wireless and/or wired data communication with the computer system 4, the sensor systems 11, 12, 13, 14, optional flow sensors 23, 33, and the valve 21 or its actuator, respectively, to control the flow of thermal transfer fluid. The controller 22 and the computer system 4 are configured (programmed) to perform various functions described later in more detail. Depending on the embodiment the communication network 5 includes fixed communication networks or busses and/or mobile communication networks, e.g. WLAN, GSM (Global System for Mobile Communications), UMTS (Universal Mobile Telephone System), or other mobile radio networks.

In the following paragraphs, described with reference to FIGS. 5-9 are possible sequences of steps performed by the control system 40, the computer system 4, and/or controller 22, respectively, for operating the thermal energy exchanger 1.

Figure 5:
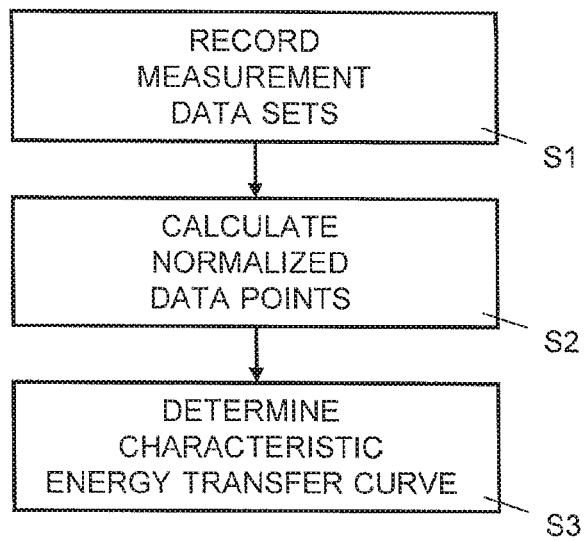
FIG. 5: shows a flow diagram illustrating an exemplary sequence of steps for operating a thermal energy exchanger using a characteristic energy transfer curve determined from normalized measurement data.
Figure 6:
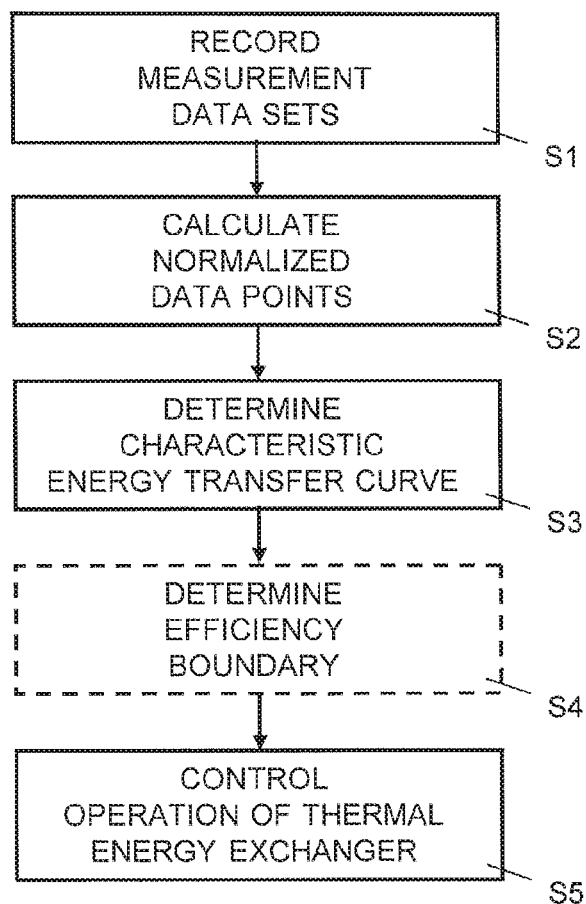
FIG. 6: shows a flow diagram illustrating an exemplary sequence of steps for operating a thermal energy exchanger using a characteristic energy transfer curve and/or an efficiency boundary determined from normalized measurement data.
Figure 7:
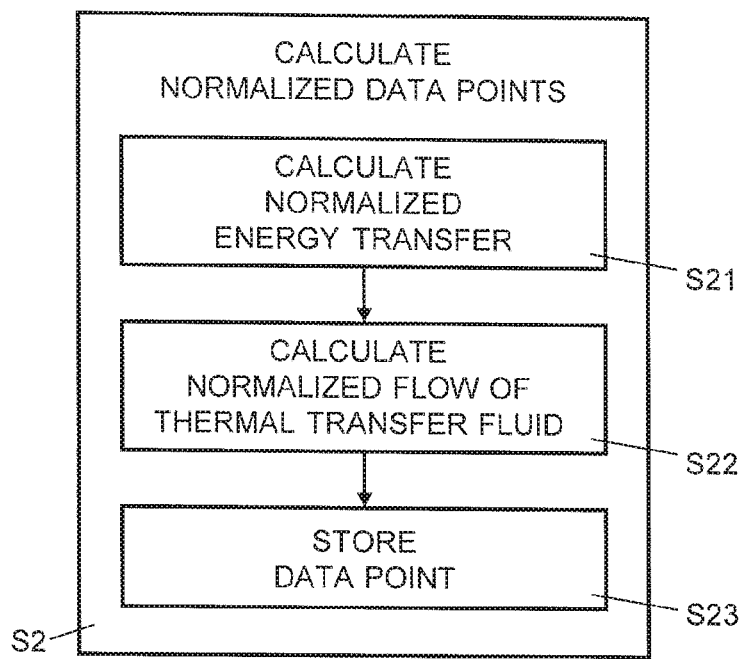
FIG. 7: shows a flow diagram illustrating an exemplary sequence of steps for calculating normalized data points from measurement data.

As illustrated in FIGS. 5 and 6, in step S1, the control system 40, i.e. the computer system 4 or the controller 22, respectively, records measurement data sets obtained from the sensor systems 11-14 and the optional air side flow sensor 33 and fluid side flow sensor 23. Specifically, the measurement data sets include for a particular point in time data values for calculating a normalized energy transfer, representing the thermal energy transferred in the thermal energy exchanger 1, from the thermal transfer fluid to the air, normalized by one or more normalization variables as will be described later in more detail.

In step S2, the computer system 4 calculates normalized data points from the measurement data sets using normalization variables which are either data values included in the measurement data sets or fixed parameter values. Normalization is the process of reducing data redundancy and increasing independency. In the present context, the normalization reduces the measurement data to a single function or curve through mathematical transformation of the data. For example, the flow of thermal transfer fluid $\Phi_W$ can be normalized using the flow of air $\Phi_A$, with or without using exponents $\alpha$, $\beta$:

$$\frac{\Phi_W}{\Phi_A} \text{ or } \frac{\Phi_W^\alpha}{\Phi_A^\beta},$$

or using a more complex normalization, such as:

$$f(\Delta H_W, g(\Delta H_{in}, \Delta H_{out}))$$

$$\text{where } g(\Delta H_{in}, \Delta H_{out}) = \frac{(\Delta H_{in} - \Delta H_{out})}{\log(\Delta H_{in}) - \log(\Delta H_{out})} \text{ and}$$

$$f(a, b) = \frac{a}{b},$$

for example. As illustrated in more detail in FIG. 7, in step S21, the computer system 4 calculates for the normalized data points a normalized total energy transfer.

The total energy or power transfer Q in the thermal energy exchanger 1 from the thermal transfer fluid to the air is defined as:

$$Q = \Phi_W \cdot \Delta H_W = \Phi_A \cdot \Delta H_A;$$

using the following data values or equations, respectively:
$Q = Q_{total}$ Total transferred energy or power
$\Phi_A$ Flow of air, airflow rate
$\Phi_W$ Flow of thermal transfer fluid, flow rate of thermal transfer fluid
$\Delta H_W = |H_{Wi} - H_{Wo}|$ Fluid (thermal transfer fluid) side enthalpy difference
$H_{Wi}$ Fluid (thermal transfer fluid) inlet enthalpy
$H_{Wo}$ Fluid (thermal transfer fluid) outlet enthalpy
$\Delta H_A = |H_{Ai} - H_{Ao}|$ Air side enthalpy difference
$H_{Ai}$ Air inlet enthalpy
$H_{Ao}$ Air outlet enthalpy If the air side sensor systems 11, 12 do not use enthalpy sensors, but a combination of humidity and temperature sensors, the following constant and further data values are used:
$c_{pAir}$ Heat capacity of air
$T_{Ai}$ Air inlet temperature
$T_{Ao}$ Air outlet temperature
$W_{Ai}$ Air inlet humidity
$W_{Ao}$ Air outlet humidity Depending on the embodiment or configuration, the data values for the measurement data sets are read from the sensors by the computer system 4 or the controller 22, or reported by the sensors to the computer system 4 or the controller 22. Alternatively, the data values are collected by the controller 22 and later reported to the computer system 4. Any measurement data set recorded by the computer system 4 defines a non-normalized data point that includes data values for a particular point in time.

The normalized total energy transfer is calculated using the log mean enthalpy difference LMED and/or the air flow $\Phi_A$:

$$\frac{Q}{LMED \cdot \Phi_A} \text{ or } \frac{Q}{\Phi_A}$$

where the log mean enthalpy difference LMED is defined as:

$$LMED = \text{Log\_mean\_enthalpy\_difference} = \frac{\Delta H_{in} - \Delta H_{out}}{\log(\Delta H_{in}) - \log(\Delta H_{out})}$$

using the following data values or equations, respectively:

$\Delta H_{in} = |H_{Ai} - H_{Wi}|$ Inlet enthalpy difference
$\Delta H_{out} = |H_{Ao} - H_{wo}|$ Outlet enthalpy difference
$\Delta H_A = |H_{Ai} - H_{Ao}|$ Air side enthalpy difference
$\Delta H_w = |H_{Wi} - H_{Wo}|$ Fluid (thermal transfer fluid) side enthalpy difference In an alternative approach, normalized total energy transfer is calculated using the log mean enthalpy difference LMED and/or the flow of thermal transfer fluid $\Phi_W$:

$$\frac{Q}{LMED \cdot \Phi_W} \text{ or } \frac{Q}{\Phi_W}$$

In step S22, the computer system 4 calculates a normalized flow of the thermal transfer fluid:

$$\frac{\Phi_W}{\Phi_A}$$

In a configuration or scenario without air flow sensor 33 and/or fluid flow sensor 23, the normalized flow of thermal transfer fluid per air flow $$\frac{\Phi_W}{\Phi_A}$$

is substituted by a representative term calculated entirely from enthalpy values, using the energy balance:

$$Q = \Phi_W \cdot \Delta H_W = \Phi_A \cdot \Delta H_A \rightarrow \frac{\Phi_W}{\Phi_A} = \frac{\Delta H_A}{\Delta H_W}$$

Furthermore, the normalized total energy transfer $$\frac{Q}{LMED \cdot \Phi_A}$$

is substituted accordingly by a representative term calculated entirely from enthalpy values, using the energy balance:

$$\frac{Q}{LMED \cdot \Phi_A} = \frac{Q}{LMED \cdot \frac{Q}{\Delta H_A}} = \frac{\Delta H_A}{LMED}$$

Correspondingly, for the alternative approach where the normalized total energy transfer is calculated using the flow of thermal transfer fluid $\Phi_W$, the normalized total energy transfer $$\frac{Q}{LMED \cdot \Phi_W}$$

is substituted accordingly by a representative term calculated entirely from enthalpy values:

$$\frac{\Delta H_W}{LMED}$$

In step S23, the computer system 4 stores the normalized data point that is defined by the normalized total energy transfer $$\frac{Q}{LMED \cdot \Phi_A} \left( \text{or } \frac{Q}{\Phi_A} \text{ or } \frac{Q}{LMED \cdot \Phi_W} \text{ or } \frac{Q}{\Phi_W} \text{ or } \frac{\Delta H_A}{LMED} \text{ or } \frac{\Delta H_W}{LMED}, \right.$$

respectively) per normalized flow of the thermal transfer fluid $$\frac{\Phi_W}{\Phi_A} \left( \text{or } \frac{\Delta H_A}{\Delta H_W}, \right.$$

respectively).

Figure 11:
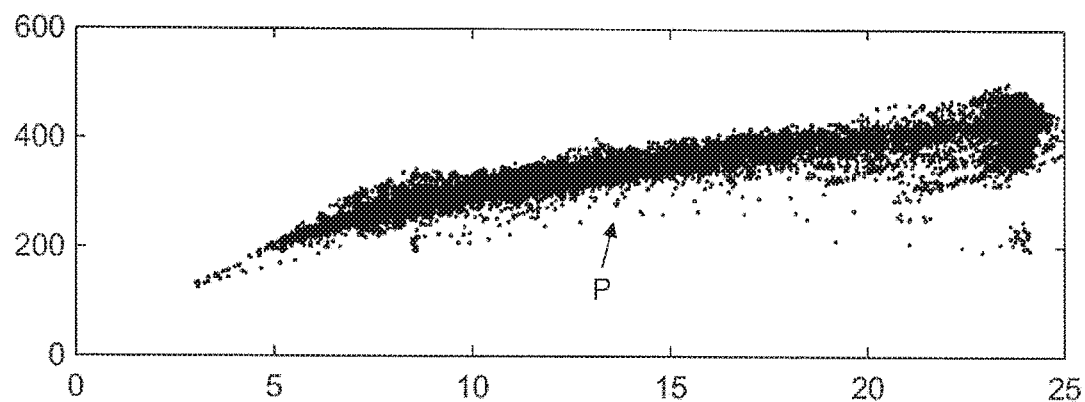
FIG. 11: shows an upper graph illustrating a plurality of non-normalized data points indicating total energy transfer per flow of thermal transfer fluid based on measurement data, and a lower graph illustrating a plurality of data points indicating normalized total energy transfer per normalized flow of thermal transfer fluid.
Figure 11:
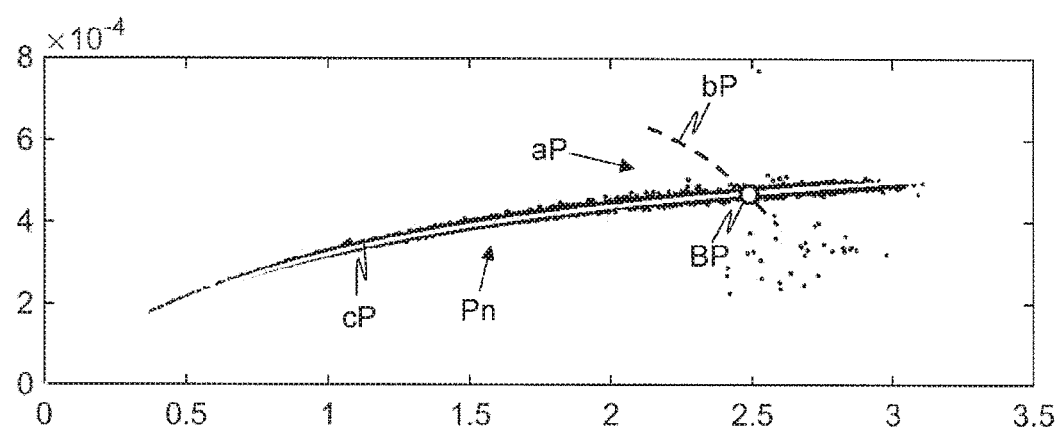

FIG. 11 illustrates in the upper graph an example of a plurality of measurement data sets, including (non-normalized) data points P with data values of total energy transfer Q per (non-normalized) flow of thermal transfer fluid $\Phi_W$. FIG. 11 illustrates in the lower graph for said example of measurement data sets the normalized data points Pn defined by the normalized total energy transfer per normalized flow of the thermal transfer fluid $$\frac{\Phi_W}{\Phi_A} \left( \text{or } \frac{\Delta H_A}{\Delta H_W}, \right.$$

respectively).

Figure 10:
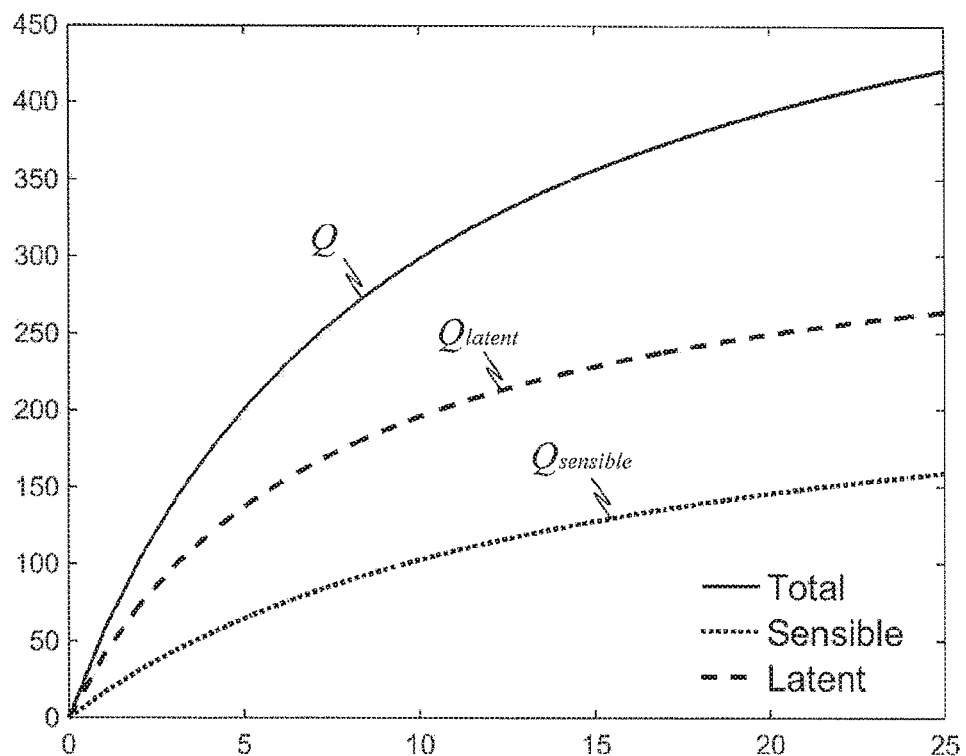
FIG. 10: shows a graph illustrating the sensible and latent parts of the total energy transfer.

FIG. 10 illustrates for an example of the total energy transfer Q the part of the latent energy $Q_{latent}$ and the part of the sensible energy $Q_{sensible}$ dependent on the flow of thermal transfer fluid $\Phi_W$.

Figure 8:
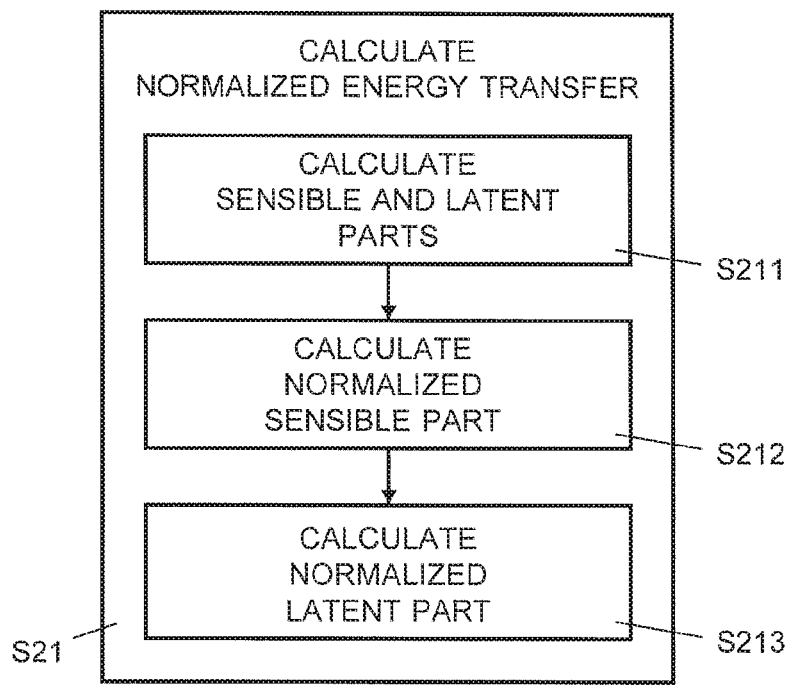
FIG. 8: shows a flow diagram illustrating an exemplary sequence of steps for calculating a normalized energy transfer.

In the embodiment of FIG. 8, in step S211, the computer system 4 calculates the sensible $Q_{sensible}$ and the latent part $Q_{latent}$ of the total energy transfer Q. Specifically, the computer system 4 uses the sensible heat ratio (SHR) for calculating the sensible $Q_{sensible}$ and the latent $Q_{latent}$ parts:

$$SHR = \frac{Q_{sensible}}{Q_{total}} = cpAir \cdot \frac{T_{Ao} - T_{Ai}}{H_{Ao} - H_{Ai}},$$

$$Q_{sensible} = SHR \cdot Q_{total} = cpAir \cdot \frac{T_{Ao} - T_{Ai}}{H_{Ao} - H_{Ai}} \cdot Q_{total}, \text{ and}$$

$$Q_{latent} = Q_{total} - Q_{sensible}.$$

In step S212, the computer system 4 calculates for the sensible part $Q_{sensible}$ a normalized sensible part. Specifically, the computer system 4 calculates the normalized sensible part using the difference of the temperature $T_{W_{in}}$ of the thermal transfer fluid entering the thermal energy exchanger 1 and the temperature $T_{A_{in}}$ of the air entering the thermal energy exchanger 1:

$$\frac{Q_{sensible}}{T_{W_i} - T_{A_i}}$$

In step S213, the computer system 4 calculates for the latent part $Q_{latent}$ a normalized latent part. Specifically, the computer system 4 calculates the normalized latent part, using the dew point temperature $T_{dewpt}$ of the air and inlet temperature of the thermal transfer fluid $T_{W_i}$:

$$\frac{Q_{latent}}{T_{dewpt} - T_{W_i}}.$$

Alternatively, the normalized latent part is calculated, using the difference of the absolute humidity value $W_{abs}$ of the air entering the thermal energy exchanger 1 and an absolute humidity value at saturation $W_{sat}(T_{W_i})$ at the temperature $T_{W_i}$ of the thermal transfer fluid entering the thermal energy exchanger 1:

$$\frac{Q_{latent}}{W_{abs} - W_{sat}(T_{W_i})}$$

Figure 12:
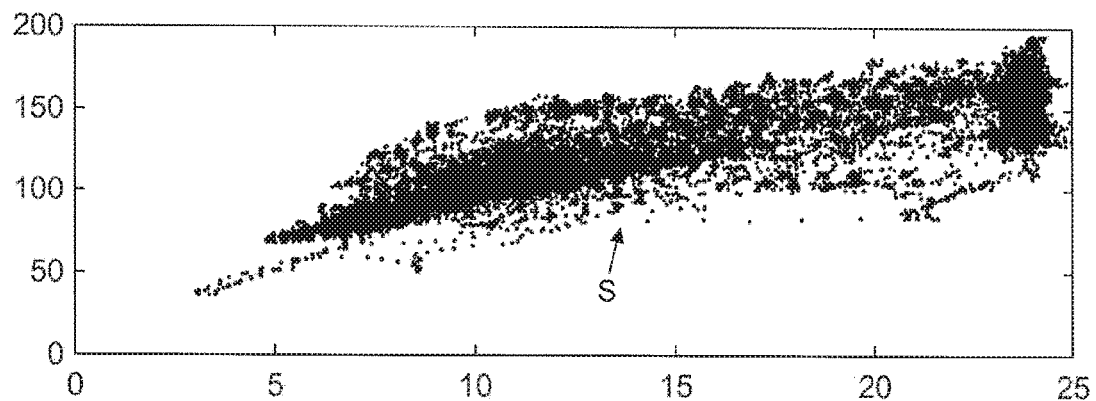
FIG. 12: shows an upper graph illustrating a plurality of non-normalized data points indicating the sensible part of the energy transfer per flow of thermal transfer fluid based on measurement data, and a lower graph illustrating a plurality of data points indicating a normalized sensible part per normalized flow of thermal transfer fluid.
Figure 12:
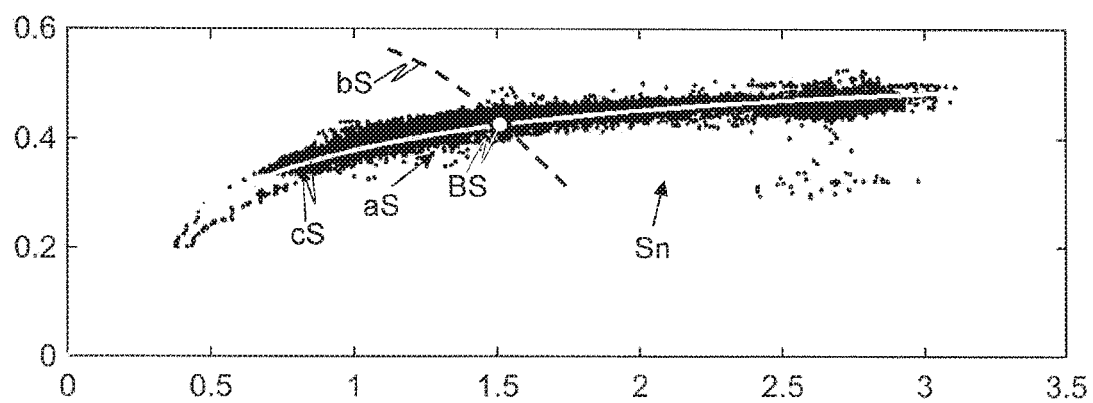

FIG. 12 illustrates in the upper graph an example of a plurality non-normalized data points S with data values of sensible energy transfer $Q_{sensible}$ per (non-normalized) flow of thermal transfer fluid $\Phi_W$. FIG. 12 illustrates in the lower graph for said example of data points S the normalized data points Sn defined by the normalized sensible energy transfer $$\frac{Q_{sensible}}{T_{W_i} - T_{A_i}}$$

per normalized flow of the thermal transfer fluid $$\frac{\Phi_W}{\Phi_A}.$$

Figure 13:
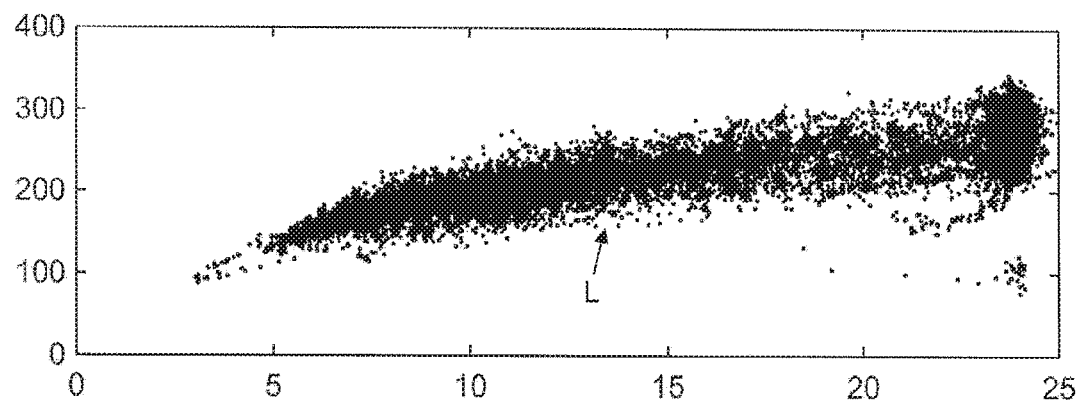
FIG. 13: shows an upper graph illustrating a plurality of non-normalized data points indicating the latent part of the energy transfer per flow of thermal transfer fluid based on measurement data, and a lower graph illustrating a plurality of data points indicating a normalized latent part per normalized flow of thermal transfer fluid.
Figure 13:
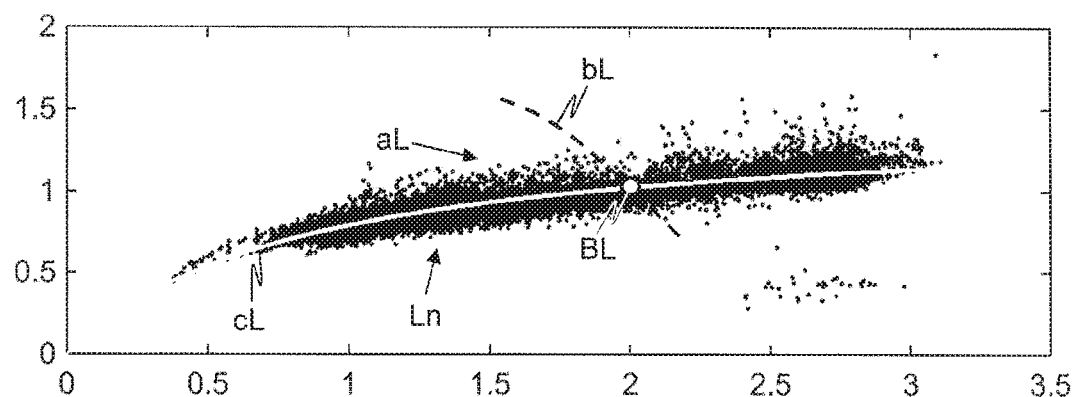

FIG. 13 illustrates in the upper graph an example of a plurality non-normalized data points L with data values of latent energy transfer $Q_{latent}$ per (non-normalized) flow of thermal transfer fluid $\Phi_W$. FIG. 13 illustrates in the lower graph for said example of data points L the normalized data points Ln defined by the normalized latent energy transfer $$\frac{Q_{latent}}{T_{dewpt} - T_{W_i}} \text{ or } \frac{Q_{latent}}{W_{abs} - W_{sat}(T_{W_i})},$$

respectively, per normalized flow of the thermal transfer fluid $$\frac{\Phi_W}{\Phi_A}.$$

It should be noted here that, as one skilled in the art will understand, graphs corresponding to those of FIGS. 11, 12, and 13 can be generated for scenarios where, without the use of flow sensors, the normalized total energy transfer is calculated entirely from enthalpy values and represented on the y-axis by normalized enthalpy values $$\frac{\Delta H_A}{LMED} \text{ or } \frac{\Delta H_W}{LMED},$$

and the normalized flow of the thermal transfer fluid is represented on the x-axis by $$\frac{\Delta H_A}{\Delta H_W}$$

(the x-axis being the conventional independent axis).

Reverting to FIGS. 5 and 6, in step S3, the computer system 4 determines a characteristic transfer curve for the thermal energy exchanger 1. Specifically, the computer system 4 determines the characteristic transfer curve for the thermal energy exchanger 1 using the normalized data points Pn, Sn, Ln calculated and recorded for the thermal energy exchanger 1 over an extended period of time, e.g. during a calibration or commissioning phase, of one or more days, or even several weeks or months, as a best fit for the plurality of normalized data points Pn, Sn, Ln. In the lower graph of FIG. 11 the fitted characteristic transfer curve cP is indicated as a white curve running through the normalized data points Pn for normalized total energy transfer. In the lower graph of FIG. 12 the fitted characteristic transfer curve cS is indicated as a white curve running through the normalized data points Sn for normalized sensible energy transfer. In the lower graph of FIG. 13 the fitted characteristic transfer curve cL is indicated as a white curve running through the normalized data points Ln for normalized sensible energy transfer.

As illustrated in the embodiment of FIG. 6, in optional step S4, the computer system 4 determines an efficiency boundary. Specifically, the computer system 4 determines the efficiency boundary bP, bS, bL (see FIGS. 11, 12, and 13) for the thermal energy exchanger 1 using the characteristic transfer curves cP, cS, cL or the normalized data points Pn, Sn, Ln. More specifically, the computer system 4 determines on the characteristic transfer curves cP, cS, cL boundary points BP, BS, BL (see FIGS. 11, 12, and 13) where the increase of the thermal energy transfer for an increase of the flow of thermal transfer fluid falls below a defined threshold value. The boundary bP, bS, bL is defined from the boundary points BP, BS, BL of several characteristic transfer curves cP, cS, cL determined for different sets of normalized data points, normalize separately for the total energy transfer, the latent energy transfer, and the sensible energy transfer, and/or for different values of the normalization variable(s) used, e.g. the log mean enthalpy difference, the air flow $\Phi_A$, the flow of thermal transfer fluid $\Phi_W$, the temperature $T_{W_i}$ of the thermal transfer fluid entering the thermal energy exchanger 1, the temperature $T_{A_i}$ of the air entering the thermal energy exchanger 1, the dew point temperature $T_{dewpt}$ of the air, the absolute humidity value $W_{abs}$ of the air entering the thermal energy exchanger 1, and/or the absolute humidity value at saturation $W_{sat}(T_{W_i})$ at the temperature $T_{W_i}$ of the thermal transfer fluid entering the thermal energy exchanger 1.

In step S5, the controller 22 controls operation of the thermal energy exchanger 1 using the efficiency boundary bP, bS, bL and/or the characteristic energy transfer curve cP, cS, cL. Specifically, the controller 22 controls operation of the thermal energy exchanger 1 by controlling operating parameters of the thermal energy exchanger 1. The operating parameters of the thermal energy exchanger 1 include the flow of the thermal transfer fluid $\Phi_W$, the air flow $\Phi_A$, and/or the temperature $T_{W_{in}}$ of the thermal transfer fluid entering the thermal energy exchanger 1. In a first aspect, the controller 22 controls the operating parameters such as to maintain a normalized performance of the thermal energy exchanger 1, whereby the controller 22 keeps the thermal energy exchanger 1 operating on the (applicable) characteristic energy transfer curve cP, cS, cL. Detection of deviations from the characteristic energy transfer curve cP, cS, cL will be described later with reference to FIG. 9. In a second aspect, the controller 22 further controls the operating parameters such as to optimize performance of the thermal energy exchanger 1, whereby the controller 22 keeps the thermal energy exchanger 1 operating within an efficient area aP, aS, aL defined by the efficiency boundary bP, bS, bL. Within the efficient area aP, aS, aL, on the characteristic energy transfer curve cP, cS, cL, the thermal energy transfer increases comparably more with an increasing flow of thermal transfer fluid, than with an increasing flow of thermal transfer on the characteristic energy transfer curve outside the efficient area aP, aS, aL. One skilled in the art will understand that efficiency boundaries and/or efficient areas can be determined correspondingly and apply accordingly to scenarios where, without the use of flow sensors, the normalized total energy transfer is calculated entirely from enthalpy values and represented by $$\frac{\Delta H_A}{LMED} \text{ or } \frac{\Delta H_W}{LMED},$$

and the normalized flow of the thermal transfer fluid is represented by $$\frac{\Delta H_A}{\Delta H_W}.$$

Depending on the scenario and/or configuration, the controller 22 is set to control the operating parameters to maintain normalized performance according to the first aspect and/or to optimize performance according to the second aspect. For embodiments or configurations where the computer system 4 is arranged separately or remotely from the controller 22, the efficiency boundary bP, bS, bL is transferred from the computer system 4 to the controller 22. Furthermore, one skilled in the art that will understand that in different embodiments, for maintaining normalized performance according to the first aspect and/or for optimizing performance according to the second aspect, the computer system 4 or the controller 22, respectively, generates control signals for controlling the operating parameters. The control signals are transmitted from the computer system 4 or the controller 22, respectively, to a building control system, a valve 21, a damper, a pump, a fan, and/or related actuators, for example.

Figure 9:
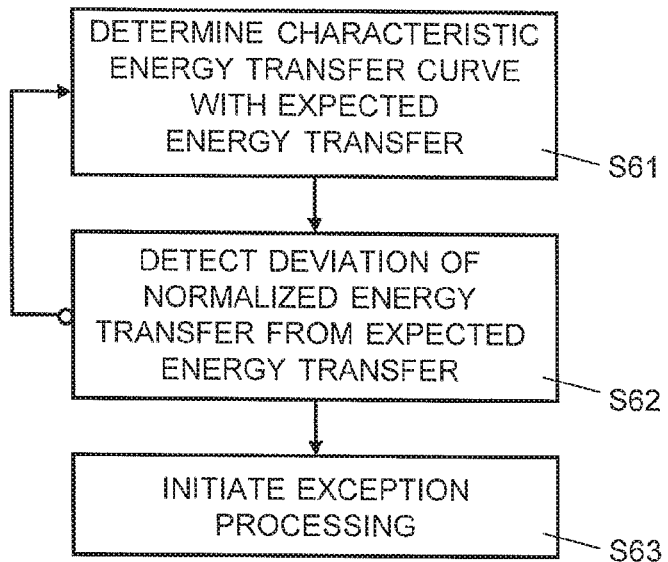
FIG. 9: shows a flow diagram illustrating an exemplary sequence of steps for detecting deviations from expected energy transfer using a characteristic energy transfer curve.

As illustrated in FIG. 9, in step S61, the computer system 4 determines the characteristic energy transfer curve cP, cS, cL that defines the expected energy transfer, i.e. the characteristic energy transfer curve cP, cS, cL that applies to the present operating conditions of the thermal energy exchanger 1, e.g. the current flow of air $\Phi_A$, the current flow of thermal transfer fluid $\Phi_W$, or the current inlet temperature of the thermal transfer fluid $T_{W_{in}}$.

In step S62, the computer system 4 detects a deviation of the normalized energy transfer from the expected energy transfer by comparing one or more data points with the current or recent normalized energy transfer to the expected energy transfer defined by the characteristic energy transfer curve cP, cS, cL selected in step S61.

Upon detection of a deviation, in step S63, the computer system 4 initiates exception processing. Depending on the scenario, embodiment, and/or configuration, the computer system 4 generates an alarm signal, an alarm message, selects an alternative characteristic energy transfer curve from a set of different characteristic energy transfer curves, and/or determines an alternative characteristic energy transfer curve using the plurality of measurement data sets. Specifically, for long term diagnostics, where for an ongoing period of time, e.g. several days, weeks, months, or even years, the normalized energy transfer continuously deviates from the expected energy transfer, the computer system 4 establishes that the current normalized data points or the related characteristic energy transfer curve deviate from the expected energy transfer, defined by an earlier characteristic energy transfer curve, e.g. determined during commissioning of the thermal energy exchanger 1, e.g. because of fauling of the coil of the thermal energy exchanger or other environmental influences. In addition to a long term diagnostic report, the computer system 4 generates a new, alternative characteristic energy transfer curve. For short or long term optimizations of exceptions or deviations, for example, if the normalized data point is detected to be within the efficient area aP, aS, aL, but below the characteristic energy transfer curve cP, cS, cL, the controller 22 controls the operating parameters such as to move the normalized data point onto the characteristic energy transfer curve cP, cS, cL. Thus, the controller 22 corrects and optimizes situations that arise from temporary disturbances or sub-optimal conditions or settings. In addition, if the normalized data point is detected to be within the efficient area aP, aS, aL, but above the characteristic energy transfer curve cP, cS, cL, the controller 22 generates an alarm or diagnostic report that indicates the detection of deviations that are caused, for example, because of sub-optimal or incorrect system setup configuration, such as arrangements of distant temperature sensors that cause excessive time lags or other settings that lead to instable system behaviours.

In further embodiments, the normalized total energy transfer is calculated using the temperatures $T_{W_i}$, $T_{W_o}$ of the thermal transfer fluid entering or exiting the thermal energy exchanger 1, respectively, and the temperatures $T_{A_i}$, $T_{A_o}$ of the air entering or exiting the thermal energy exchanger 1, respectively, for example:

$$\frac{Q \cdot (T_{W_i} - T_{W_o})}{T_{a_i}} \text{ or } \frac{Q \cdot (T_{W_i} - T_{W_o})}{T_{a_o} - T_{a_i}}.$$

As described above, the normalization variables used for calculating the normalized energy transfer include air side variables, such as the flow of air through the thermal energy exchanger $\Phi_A$, the temperature $T_{A_i}$ of the air entering the thermal energy exchanger 1, the temperature $T_{A_o}$ of the air exiting the thermal energy exchanger 1, the dew point temperature $T_{dewpt}$ of the air, the absolute humidity value $W_{Ai}$ of the air entering the thermal energy exchanger 1, the absolute humidity value $W_{Ao}$ of the air exiting the thermal energy exchanger 1, and the absolute humidity value at saturation $W_{sat}(T_{W_i})$ at the temperature $T_{W_i}$ of the thermal transfer fluid entering the thermal energy exchanger 1; the air inlet enthalpy value $H_{Ai}$, the air outlet enthalpy value $H_{Ao}$, the air side enthalpy difference $\Delta H_A = |H_{Ai} - H_{Ao}|$, as well as composite variables based on air side variables, such as the log mean enthalpy difference LMED; and variables on the thermal transfer fluid side, such as the flow of thermal transfer fluid $\Phi_W$, the temperature $T_{W_i}$ of the thermal transfer fluid entering the thermal energy exchanger 1, and the temperature $T_{W_o}$ of the thermal transfer fluid exiting the thermal energy exchanger 1.

It should be noted that, in the description, the sequence of the steps has been presented in a specific order, one skilled in the art will understand, however, that the order of at least some of the steps could be altered, without deviating from the scope of the invention.

The invention claimed is:

1. A method of operating a thermal energy exchanger for exchanging thermal energy between a thermal transfer fluid, flowing through the thermal energy exchanger in a fluid conduit, and air, being conducted through the thermal energy exchanger in an air duct, the method comprising:
    recording in a control system a plurality of measurement data sets, each of the measurement data sets including for a different point in time data values defining a normalized energy transfer which represents the thermal energy transferred in the thermal energy exchanger, from the thermal transfer fluid to the air, normalized by one or more normalization variables;
    the control system calculating for each of the measurement data sets a normalized data point (Pn, Sn, Ln) defined by the normalized energy transfer;
    the control system determining for the thermal energy exchanger a characteristic energy transfer curve (cP, cS, cL) which fits the normalized data points (Pn, Sn, Ln); and
    the control system controlling operation of the thermal energy exchanger using the characteristic energy transfer curve (cP, cS, cL).

2. The method of claim 1, further comprising the control system determining a boundary (bP, bS, bL) for efficient thermal energy transfer in the thermal energy exchanger between the thermal transfer fluid and the air,
    whereby the boundary (bP, bS, bL) defines an efficient area (aP, aS, aL), where on the characteristic energy transfer curve (cP, cS, cL) the thermal energy transfer is more energy efficient than on the characteristic energy transfer curve (cP, cS, cL) outside the efficient area (aP, aS, aL); and the control system keeping the thermal energy exchanger operating within said efficient area (aP, aS, aL).

3. The method of claim 1, wherein the control system controls operating parameters to maintain operation of the thermal energy exchanger on the characteristic energy transfer curve (cP, cS, cL), the operating parameters comprising at least one of:
    flow of thermal transfer fluid through the thermal energy exchanger, flow of air through the thermal energy exchanger, and
    temperature of the thermal transfer fluid entering the thermal energy exchanger.

4. The method of claim 1,
    wherein each of the measurement data sets includes an air inlet enthalpy value, an air outlet enthalpy value, a thermal transfer fluid inlet enthalpy value, and a thermal transfer fluid outlet enthalpy value; and
    wherein the control system calculates the normalized energy transfer for each of the normalized data points (Pn, Sn, Ln), using the air inlet enthalpy value, the air outlet enthalpy value, the thermal transfer fluid inlet enthalpy value, and the thermal transfer fluid outlet enthalpy value.

5. The method of claim 1,
    wherein each of the measurement data sets includes a temperature value of the air entering the thermal energy exchanger, a temperature value of the air exiting the thermal energy exchanger, a humidity value of the air entering the thermal energy exchanger, a humidity value of the air exiting the thermal energy exchanger, a temperature value of the thermal transfer fluid entering the thermal energy exchanger, and a temperature value of the thermal transfer fluid exiting the thermal energy exchanger; and
    wherein the control system calculates the normalized energy transfer for each of the normalized data points (Pn, Sn, Ln), using the temperature value of the air entering the thermal energy exchanger, the temperature value of the air exiting the thermal energy exchanger, the humidity value of the air entering the thermal energy exchanger, the humidity value of the air exiting the thermal energy exchanger, the temperature value of the thermal transfer fluid entering the thermal energy exchanger, and the temperature value of the thermal transfer fluid exiting the thermal energy exchanger.

6. The method of claim 1,
    wherein each of the measurement data sets includes for the different points in time the flow of thermal transfer fluid through the thermal energy exchanger and the flow of air through the thermal energy exchanger; and
    wherein the control system calculates for each of the normalized data points (Pn, Sn, Ln) a normalized flow of thermal transfer fluid through the fluid conduit normalized by the flow of air.

7. The method of claim 1,
    wherein each of the measurement data sets includes data values defining a log mean enthalpy difference from an inlet enthalpy difference, of the air entering the thermal energy exchanger and the thermal transfer fluid entering the thermal energy exchanger, and an outlet enthalpy difference, of the air exiting the thermal energy exchanger and the thermal transfer fluid exiting the thermal energy exchanger; and
    wherein the control system calculates the normalized energy transfer for each of the normalized data points (Pn) using the log mean enthalpy difference.

8. The method of claim 1,
    wherein each of the measurement data sets includes the flow of air through the thermal energy exchanger; and
    wherein the control system calculates the normalized energy transfer for each of the normalized data points (Pn) using the flow of air through the thermal energy exchanger.

9. The method of claim 1,
    wherein each of the measurement data sets includes the flow of thermal transfer fluid through the thermal energy exchanger; and
    wherein the control system calculates the normalized energy transfer for each of the normalized data points (Pn) using the flow of thermal transfer fluid through the thermal energy exchanger.

10. The method of claim 1,
    wherein each of the measurement data sets includes for the different points in time data values defining an air side enthalpy difference of the air entering the thermal energy exchanger and the air exiting the thermal energy exchanger, and data values defining an enthalpy difference on the thermal transfer fluid side of the thermal transfer fluid entering the thermal energy exchanger and the thermal transfer fluid exiting the thermal energy exchanger; and wherein the control system calculates for each of the normalized data points (Pn) a value representative of the normalized flow, from the air side enthalpy difference and the enthalpy difference on the thermal transfer fluid side.

11. The method of claim 10,
wherein each of the measurement data sets includes data values defining a log mean enthalpy difference from an inlet enthalpy difference, of the air entering the thermal energy exchanger and the thermal transfer fluid entering the thermal energy exchanger, and an outlet enthalpy difference, of the air exiting the thermal energy exchanger and the thermal transfer fluid exiting the thermal energy exchanger; and
wherein the control system calculates the normalized energy transfer for each of the normalized data points (Pn) using the air side enthalpy difference and the log mean enthalpy difference.

12. The method of claim 10,
wherein each of the measurement data sets includes data values defining a log mean enthalpy difference from an inlet enthalpy difference, of the air entering the thermal energy exchanger and the thermal transfer fluid entering the thermal energy exchanger, and an outlet enthalpy difference, of the air exiting the thermal energy exchanger and the thermal transfer fluid exiting the thermal energy exchanger; and
wherein the control system calculates the normalized energy transfer for each of the normalized data points (Pn) using the enthalpy difference on the thermal transfer fluid side and the log mean enthalpy difference.

13. The method of claim 2,
wherein each of the measurement data sets includes data values for determining a sensible part and a latent part of the thermal energy transferred in the thermal energy exchanger, from the thermal transfer fluid to the air; the control system calculates a normalized sensible part and a normalized latent part, using one or more normalization variables; and the control system determines boundaries (bS, bL) for efficient thermal energy transfer in the thermal energy exchanger between the thermal transfer fluid and the air separately for the normalized sensible part and the normalized latent part; and
wherein the control system keeps the thermal energy exchanger operating within efficient areas (aS, aL) defined by said boundaries (bS, bL).

14. The method of claim 13,
wherein each of the measurement data sets includes a temperature value of the thermal transfer fluid entering the thermal energy exchanger, and a temperature value of the air entering the thermal energy exchanger; and
wherein the control system calculates the normalized sensible part (Sn) of the thermal energy transferred in the thermal energy exchanger using the difference of the temperature value of the thermal transfer fluid entering the thermal energy exchanger and the temperature value of the air entering the thermal energy exchanger.

15. The method of claim 13,
wherein each of the measurement data sets includes a temperature value of the thermal transfer fluid entering the thermal energy exchanger; and wherein the control system calculates the normalized latent part (Ln) of the thermal energy transferred in the thermal energy exchanger using the difference of the temperature value of a dew point temperature of the air and temperature the thermal transfer fluid entering the thermal energy exchanger.

16. The method of claim 13,
wherein each of the measurement data sets includes a temperature value of the thermal transfer fluid entering the thermal energy exchanger, an absolute humidity value of the air entering the thermal energy exchanger, and a temperature value of the thermal transfer fluid entering the thermal energy exchanger; and
wherein the control system calculates the normalized latent part (Ln) of the thermal energy transferred in the thermal energy exchanger using the difference of the absolute humidity value of the of the air entering the thermal energy exchanger and an absolute humidity value at saturation at the temperature value of the thermal transfer fluid entering the thermal energy exchanger.

17. The method of claim 1, further comprising the control system determining a characteristic energy transfer curve (cP, cS, cL), which indicates an expected energy transfer in the thermal energy exchanger from the thermal transfer fluid to the air; the control system detecting a deviation of the normalized energy transfer (Pn, Sn, Ln) from the expected energy transfer; and, upon detection of a deviation, the control system initiating exception processing.

18. The method of claim 17, further comprising the control system selecting a characteristic energy transfer curve (cP, cS, cL) from a set of different characteristic energy transfer curves (cP, cS, cL), which indicate for different air side parameters an expected energy transfer in the thermal energy exchanger from the thermal transfer fluid to the air, using airside parameters included in the measurement data sets.

19. The method of claim 17, further comprising the control system including in the exception processing at least one of the following steps: generating an alarm signal, selecting an alternative characteristic energy transfer curve (cP, cS, cL) from a set of different characteristic energy transfer curves (cP, cS, cL), and determining an alternative characteristic energy transfer curve (cP, cS, cL) using the plurality of measurement data sets.

20. A control system for operating a thermal energy exchanger for exchanging thermal energy between a thermal transfer fluid, flowing through the thermal energy exchanger in a fluid conduit, and air, being conducted through the thermal energy exchanger in an air duct, the control system comprising at least one processor configured to:
record in the control system a plurality of measurement data sets, each of the measurement data sets including for a different point in time data values defining a normalized energy transfer which represents the thermal energy transferred in the thermal energy exchanger, from the thermal transfer fluid to the air, normalized by one or more normalization variables;
calculate for each of the measurement data sets a normalized data point (Pn, Sn, Ln) defined by the normalized energy transfer;
determine for the thermal energy exchanger a characteristic energy transfer curve (cP, cS, cL) which fits the normalized data points (Pn, Sn, Ln); and
control operation of the thermal energy exchanger using the characteristic energy transfer curve (cP, cS, cL).

21. The control system of claim 20, wherein the processor is further configured to determine a boundary (bP, bS, bL) for efficient thermal energy transfer in the thermal energy exchanger between the thermal transfer fluid and the air, whereby the boundary (bP, bS, bL) defines an efficient area (aP, aS, aL), where on the characteristic energy transfer curve (cP, cS, cL) the thermal energy transfer is more energy efficient than on the characteristic energy transfer curve (cP, cS, cL) outside the efficient area (aP, aS, aL); and keep the thermal energy exchanger operating within said efficient area (aP, aS, aL).

22. The control system of claim 20, wherein the processor is further configured to perform a method of operating a thermal energy exchanger for exchanging thermal energy between a thermal transfer fluid, flowing through the thermal energy exchanger in a fluid conduit, and air, being conducted through the thermal energy exchanger in an air duct, the method comprising:
- recording in the control system a plurality of measurement data sets, each of the measurement data sets including for a different point in time data values defining a normalized energy transfer which represents the thermal energy transferred in the thermal energy exchanger, from the thermal transfer fluid to the air, normalized by one or more normalization variables including at least one air side variable;
- the control system calculating for each of the measurement data sets a normalized data point (Pn, Sn, Ln) defined by the normalized energy transfer; and
- the control system determining for the thermal energy exchanger a characteristic energy transfer curve (cP, cS, cL) which fits the normalized data points (Pn, Sn, Ln), and
- the control system determining a boundary (bP, bS, bL) for efficient thermal energy transfer in the thermal energy exchanger between the thermal transfer fluid and the air, whereby the boundary (bP, bS, bL) defines an efficient area (aP, aS, aL), where on the characteristic energy transfer curve (cP, cS, cL) the thermal energy transfer is more energy efficient than on the characteristic energy transfer curve (cP, cS, cL) outside the efficient area (aP, aS, aL); and the control system keeping the thermal energy exchanger operating within said efficient area (aP, aS, aL).

23. A computer program product comprising a non-transient computer-readable medium having stored thereon computer program code configured to control a processor of a control system for operating a thermal energy exchanger for exchanging thermal energy between a thermal transfer fluid, flowing through the thermal energy exchanger in a fluid conduit, and air, being conducted through the thermal energy exchanger in an air duct, such that the processor performs the following steps:
- recording in the control system a plurality of measurement data sets, each of the measurement data sets including for a different point in time data values defining a normalized energy transfer which represents the thermal energy transferred in the thermal energy exchanger, from the thermal transfer fluid to the air, normalized by one or more normalization variables;
- calculating for each of the measurement data sets a normalized data point (Pn, Sn, Ln) defined by the normalized energy transfer; and
- determining for the thermal energy exchanger a characteristic energy transfer curve (cP, cS, cL) which fits the normalized data points (Pn, Sn, Ln); and
- controlling operation of the thermal energy exchanger using the characteristic energy transfer curve (cP, cS, cL).

24. The computer program product of claim 23, wherein the computer program code is further configured to control the processor such that the processor determines a boundary (bP, bS, bL) for efficient thermal energy transfer in the thermal energy exchanger between the thermal transfer fluid and the air, whereby the boundary (bP, bS, bL) defines an efficient area (aP, aS, aL), where on the characteristic energy transfer curve (cP, cS, cL) the thermal energy transfer is more energy efficient than on the characteristic energy transfer curve (cP, cS, cL) outside the efficient area (aP, aS, aL); and keeps the thermal energy exchanger operating within said efficient area (aP, aS, aL).

25. A computer program product comprising a non-transient computer-readable medium having stored thereon computer program code configured to control a processor of a control system such that the processor performs a method of operating a thermal energy exchanger for exchanging thermal energy between a thermal transfer fluid, flowing through the thermal energy exchanger in a fluid conduit and air, being conducted through the thermal energy exchanger in an air duct, the method comprising:
- recording in the control system a plurality of measurement data sets, each of the measurement data sets including for a different point in time data values defining a normalized energy transfer which represents the thermal energy transferred in the thermal energy exchanger, from the thermal transfer fluid to the air, normalized by one or more normalization variables including at least one air side variable;
- the control system calculating for each of the measurement data sets a normalized data point (Pn, Sn, Ln) defined by the normalized energy transfer; and
- the control system determining for the thermal energy exchanger a characteristic energy transfer curve (cP, cS, cL) which fits the normalized data points (Pn, Sn, Ln), and
- the control system determining a boundary (bP, bS, bL) for efficient thermal energy transfer in the thermal energy exchanger between the thermal transfer fluid and the air, whereby the boundary (bP, bS, bL) defines an efficient area (aP, aS, aL), where on the characteristic energy transfer curve (cP, cS, cL) the thermal energy transfer is more energy efficient than on the characteristic energy transfer curve (cP, cS, cL) outside the efficient area (aP, aS, aL); and the control system keeping the thermal energy exchanger operating within said efficient area (aP, aS, aL).

* * * * *